Jan. 16, 1968  S. M. MILLER  3,363,645
CHECK PLATE WITH REINFORCED SEALING MEMBER
Filed Oct. 21, 1963
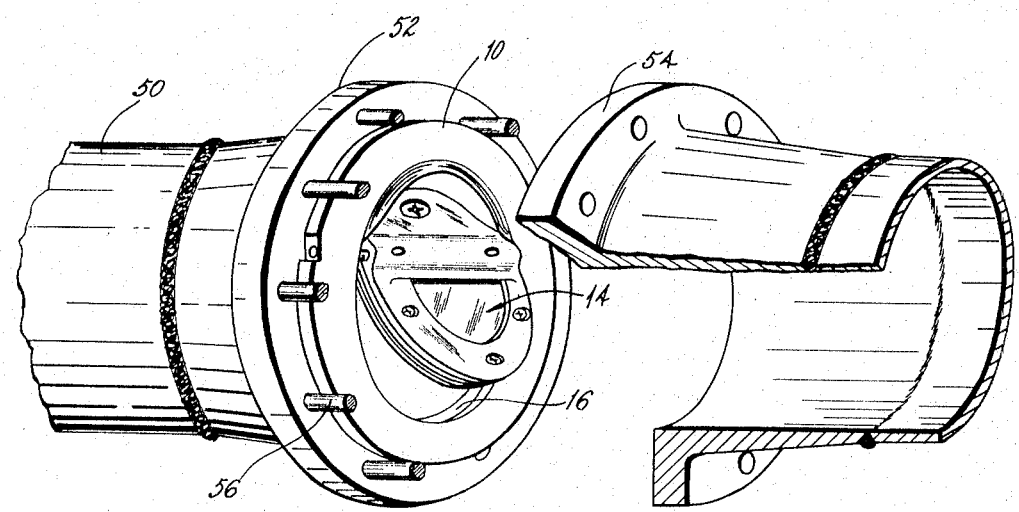
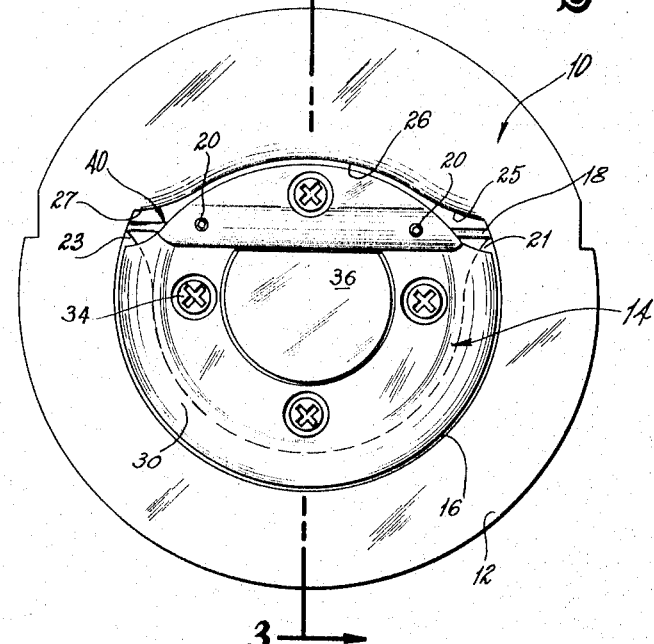
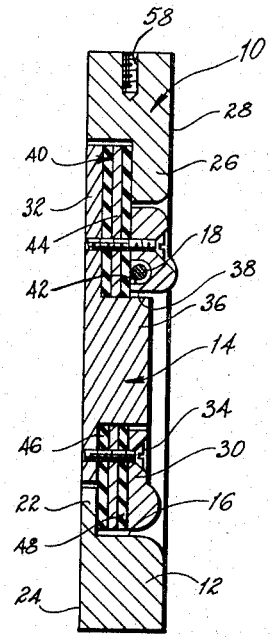
INVENTOR.
SHELDON M. MILLER
BY William S Dorman
ATTORNEY

United States Patent Office 3,363,645
Patented Jan. 16, 1968

3,363,645
CHECK PLATE WITH REINFORCED
SEALING MEMBER
Sheldon M. Miller, 1403 E. 5th Court,
Tulsa, Okla. 74120
Filed Oct. 21, 1963, Ser. No. 317,621
3 Claims. (Cl. 137—527)

This invention relates to improvements in valves and more particularly, but not by way of limitation, to a check plate valve having a reinforced sealing member for increasing the sealing efficiency of the valve.

Check valves are in wide spread use today in flow lines, and the like, wherein it is desired to permit substantially free flow of fluid in one direction and preclude flow of the fluid in an opposite direction. It is frequently desirable to interpose a valve structure of this type in a flow line in a manner requiring a minimum of longitudinal space, such as directly between pairs of abutting flange fittings or the like. In order to solve this problem, many check valves of a relatively small overall length have been developed for disposition between a pair of abutting pipe fittings. One valve of this type is commonly known as a check plate and normally comprises an annular disc having a pivotal closure or clapper member carried thereby. The closure member is usually secured within the central bore of the disc by means of a pivot pin extending transversely through the disc and closure member whereby the closure or clapper may swing freely thereabout. Normally the clapper member is arranged for freely opening in one direction to permit flow of fluid through the bore of the disc. However, shoulder means is usually provided on the inner periphery of the disc for cooperation of the outer periphery of the closure member to limit rotation thereof in an opposite direction. The shoulder means thus provides a valve seat for the closure member to preclude flow of the fluid through the bore in the reverse or opposite direction. These valves have a particular disadvantage in that an efficient sealing between the disc member and closure member in the proximity of the pivot pin is difficult to achieve. As a result, valves of this type may frequently leak around the pivot in the closed position of the valve, particularly when the fluid pressure acting on the closure member is great.

The present invention contemplates a novel check plate structure having a sealing member particularly designed and constructed for increasing the sealing efficiency of the valve in the closed position thereof. The check plate may be readily interposed between suitable pipe fittings, such as flanged fittings, or the like, whereby the closure member may rotate freely for opening and closing of the valve. The sealing member is carried by the closure member and cooperates with shoulder or valve seat means provided on the inner periphery of the outer body for sealing the check plate in the closed position thereof. The sealing member is a laminated type structure having a reinforcing member integral therewith whereby the sealing member is provided with a self-contained back-up member. Thus, the sealing ring provides its own support in the proximity of the pivot pin, independent of the valve seat means, and greatly decreases the possibility of fluid leakage in the closed position of the valve.

It is an important object of this invention to provide a check valve structure particularly designed and constructed for ease of installation in a flow line, or the like.

It is another object of this invention to provide a novel check plate having a freely rotatably closure member movable in one direction for opening of the valve and efficiently sealed subsequent to rotation in an opposite direction for closing of the valve.

Another object of this invention is to provide a check plate having a novel seal means for increasing the sealing efficiency of the check plate in the closed position thereof.

Still another object of this invention is to provide a novel sealing means for a check plate having a self-contained reinforcing member for increasing the efficiency of the sealing member.

A further object of this invention is to provide a novel check plate having reinforced sealing means which is simple and efficient in operation and economical and durable in construction.

Other objects and advantages of the invention will be evident from the following detailed description, read in conjunction with the accompanying drawings, which illustrate my invention.

In the drawings:

FIGURE 1 is an exploded perspective view of a pipe line having a check plate embodying the invention disposed therein and with portions cut away for purposes of illustration.

FIGURE 2 is a front elevational view of a check plate embodying the invention.

FIGURE 3 is a sectional elevational view taken on line 3—3 of FIGURE 2.

Referring to the drawings in detail, reference character 10 generally indicates a check plate comprising a substantially annular disc or outer body 12 having a closure or clapper member 14 pivotally secured in the central bore 16 thereof. The clapper 14 may be pivotally secured to the disc 12 in any suitable manner and as shown herein, a pivot pin 18 extends transversely through the clapper member 14 and is secured thereto by suitable seat screws 20, or the like, for simultaneous rotation therebetween. The opposite ends of the pivot shaft 18 are suitably journalled in the disc 12 in any well known manner (not shown), thus providing for free rotation of the clapper 14.

It will be readily apparent from an inspection of the drawings that the pivot shaft 18 is preferably spaced from the central axis of the clapper member 14 whereby a greater portion of the clapper 14 is disposed below the pivot pin 18 than above the pin 18. Thus, a preponderance of weight is provided below the pivot axis of the clapper 14 whereby gravity will constantly urge the clapper 14 toward a closed position or substantially coplanar position with respect to the body 12, as will be hereinafter set forth in detail.

A shoulder 22 is directed radially inwardly of the central bore 16 from one face 24 (FIGURE 3) of the body 12 and extends throughout substantially two-thirds of the circumference of the bore 16 in the particular embodiment depicted herein. The opposite ends 21 and 23 of the shoulder 22 terminate in the proximity of the under side of the pivot pin 18, as particularly indicated in dotted lines in FIGURE 2. It will be apparent that the position of the pivot pin 18 with respect to the body 12 will determine the overall length or extension of the shoulder 22. A second radially inwardly directed shoulder 26 is provided on the opposite face 28 of the body 12 and extends around substantially the remaining portion of the bore 16 with the opposite ends 25 and 27 thereof terminating slightly upwardly of the pivot pin 18. The two shoulders 22 and 26 provide a valve seat for the closure member 14, as will be hereinafter set forth in detail. It will be apparent that the juncture between the ends 21 and 23 of the shoulder 22 and 25 and 27, respectively, of the shoulder 26, which are located adjacent the pivot pin 18, provides a hiatus between the said shoulders around the pivot pin 18 extending from the opposite sides of the clapper member 14. At each hiatus, there is no valve seat portion provided integral with the body 12.

The closure or clapper member 14 is preferably of a substantially circular configuration and as shown herein comprises a substantially annular ring member 30 removably secured to a plate 32 in any suitable manner, such as a plurality of spaced screws 34, or the like. The plate 32 may be provided with a substantially centrally disposed axially extending box 36 for disposition within the bore 38 of the ring member 30 for facilitating alignment between the plate 32 and ring 30. A laminated sealing gasket, generally indicated at 40, is interposed between the plate 32 and the ring member 30 for sealing of the check plate 10 in the closed position thereof, as will be hereinafter set forth. A transversely extending recess or groove 42 is provided on one face of the ring 30 adjacent the sealing gasket 40 for receiving the pivot pin therethrough, thus the clapper member 14 may be secured to the pivot pin 18 by the set screws 20.

Referring particularly to FIGURE 3, it will be apparent that the plate member 32 and ring 30 are so arranged with respect to each other whereby the outer periphery of the plate 32 extends beyond the outer periphery of the ring 30 throughout a portion of the upper circumferences thereof through a distance substantially conforming to the length of the shoulder 26 and cooperates with the gasket 40 for seating thereof against the shoulder 26 in the closed position of the check plate 10. Similarly, the lower circumferential portion of the ring 30 extends beyond substantially the remaining circumference of the plate 32 complementary to the shoulder 22 for cooperating with the shoulder 22 and sealing gasket 40 to provide for sealing of the valve 10 in the closed position thereof. At each juncture between the over lapping portions of the plate 32 and ring 30 there is no support for the sealing gasket 40 and these junctures coincide substantially with each hiatus between the shoulders 22 and 26.

The sealing gasket 40 is preferably of a substantially annular configuration for disposition between the ring 30 and plate 32 and around the boss 36. The gasket 40 is of a laminated or sandwich type structure and comprises an inner rigid ring or reinforcing member 44, preferably constructed from a suitable metallic material, but not limited thereto. The reinforcing ring 44 is provided with resilient layers or rings 46 and 48 bonded to each of the opposite faces thereof. The resilient or yielding layers 46 and 48 bear against the shoulders 22 and 26 and the ring 30 and plate 32 in the closed position of the clapper member 14 for substantially precluding leakage of fluid through the valve 10. The rigid reinforcing element 44 provides a self-contained back-up member for the sealing gasket 40 at each hiatus between the shoulders 22 and 26 and at the juncture of the over lapping portions of the ring 30 and plate 32. Thus, the sealing gasket 40 provides an efficient sealing in the proximity of the pivot pin 18 extending between the clapper member 14 and body 12.

Operation

The check plate 10 may be interposed in substantially any piping system, or the like, wherein it is desired to check the flow of fluid in one direction and permit the flow of fluid in a reverse direction. As depicted in FIGURE 1, for purposes of illustration, the check plate 10 is interposed in a flow line 50 and is disposed between a pair of abutting flange fittings 52 and 54. The fittings 52 and 54 are shown in an exploded or separated position in order to illustrate the placement of the check plate 10 therebetween. The flanges 52 and 54 are normally secured in abutting relationship by a plurality of suitable circumferentially spaced bolts 56, as is well known. It is preferable that the outer periphery of the body 12 be slightly smaller than the circle defined by the innermost portions of the bolts 56 whereby the bolts may be utilized for properly aligning the check plate 10 within the flow line 50 and for securely retaining the check plate in position between the abutting flanges.

A radially extending threaded aperture 58 (FIGURE 3) may be provided in the outer periphery of the body 12 for facilitating installation of the check plate 10 between the fittings 52 and 54. In order to install the check plate 10, the bolts 56 may be sufficiently loosened for permitting a slight spreading of the flanges 52 and 54. It is usually necessary to remove only those bolts 56 disposed around the upper half of the flange fitting circumference. A suitable flange spreader device (not shown) may be inserted between the flanges for spreading or separation thereof a sufficient distance to receive the check plate therebetween, as is well known. A suitable installation tool (not shown) may be threadily engaged with the aperture 58 whereby the check plate may be inserted between the slightly spaced flanges 52 and 54. The outer periphery of the body 12 will be cradled in the lower or remaining bolts 56 and supported thereby, and the removed upper bolts 56 may then be replaced and the check plate may be securely clamped between the flanges. Of course, the installation tool may be disengaged from the bore 58 when the check plate is installed or secured between the flanges 52 and 54.

The check plate 10 is disposed between the fitting members 52 and 54 in such a manner that the closure member 14 is free to rotate for opening thereof to permit flow of fluid through the flow line 50 in the desired direction. The shoulders 22 and 26 cooperate with the closure member 14 to limit rotation of the closure in an opposite direction whereby a reverse flow of fluid through the line 50 is precluded. In the closed position of the check plate 10, the gasket member 40 is disposed adjacent the opposed shoulders or seats 22 and 26, as shown in FIGURE 3, and the pressure of the fluid acting on the closure member 14 maintains the gasket 40 in a sealing engagement with the valve seats to preclude leakage of the fluid. As hereinbefore set forth, a preponderance of weight is provided below the pivot pin 18 in order that gravity will tend to maintain the clapper member 14 in a normally closed position, thus, facilitating the overall operation of the check plate 10.

There is no support provided for the gasket 40 in the proximity of the pivot pin 18 by either the body 12 or the closure member 14 at the opposite points wherein the pivot pin is exposed between the clapper and body. As a result, the fluid pressure in the flow line 50 acting on the closure member in the closed position thereof will bear directly against the exposed face of the gasket 40. The reinforcing ring 44 functions as a self-contained back-up member for the gasket 40, particularly at the hiatus between the respective ends of the shoulders 22 and 26, and efficiently precludes flexing or distortion of the sealing gasket at each hiatus and substantially precludes leakage of fluid in the proximity of the pivot pin 18 extending between the closure member 14 and the body 12. Thus, the overall operating efficiency and sealing qualities of the check plate 10 are greatly increased.

From the foregoing, it will be apparent that the present invention provides a novel check plate type valve for installation in a piping system wherein it is desired to check the flow of fluid therethrough in at least one direction. The novel check plate is of a relatively short overall length and may be readily disposed between abutting pipe fittings, or the like, in a minimum of longitudinal space. The closure member is provided with a novel sealing gasket particularly designed and constructed with a self-contained back-up member for increasing the sealing efficiency in the closed position of the check plate. The novel check plate is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A check valve comprising a substantially annular body member, a closure member, pivot pin means extending between the body and the closure member for journalling the closure member within the body for free rotation in one direction to provide an open position for the valve, an inwardly directed valve seat provided on one face of the body and extending around a portion of the inner periphery thereof, an oppositely disposed inwardly directed valve seat provided on the opposite face of the body and extending around substantially the remaining portion of the inner periphery thereof, said valve seats cooperating with the closure member for limiting the rotation thereof in an opposite direction to provide a closed position for the valve, said closure member comprising a plate member secured to a ring member whereby one portion of the plate member extends radially outward from the ring member throughout a portion of the outer periphery thereof and a portion of the ring member extends radially outward from the plate member throughout substantially the remaining portion of the outer periphery thereof, a laminated sealing gasket secured between the ring and plate members for engagement between the ring and plate members and the valve seats for precluding leakage of fluid in the closed position of the valve, and said laminated sealing gasket comprising an inner rigid reinforcing member having a resilient sealing member bonded to the opposite faces thereof, said reinforcing member providing a self-contained back-up member for the sealing gasket to increase the sealing efficiency thereof.

2. A check valve comprising a substantially annular body member, a closure member journaled in the body member for rotation with respect thereto in one direction to provide an open position for the valve, valve seat means provided in the body for cooperation with the closure member for limiting the rotation of the closure member in an opposite direction to provide a closed position for the valve, said closure member comprising a plate member secured to a ring member whereby one portion of the plate member extends radially outwardly from the ring member throughout a portion of the outer periphery thereof and a portion of the ring member extends radially outward from the plate member throughout substantially the remaining portion of the outer periphery thereof, a laminated sealing gasket secured between the ring and plate members for engagement between the ring and plate members and the valve seat means for precluding leakage of fluid in the closed position of the valve, and said laminated sealing gasket comprising an inner rigid reinforcing member having a resilient sealing member bonded to the opposite faces thereof, said reinforcing member providing a self-contained back-up member for the sealing gasket to increase the sealing efficiency thereof.

3. A check valve comprising a substantially annular body member, a closure member journaled in the body member for rotation with respect thereto in one direction to provide an open position for the valve, valve seat means provided in the body for cooperation with the closure member for limiting the rotation of the closure member in an opposite direction to provide a closed position for the valve, said closure member comprising a plate member secured to a ring member whereby one portion of the plate member extends radially outward from the ring member throughout a portion of the outer periphery thereof and a portion of the ring member extends radially outward from the plate member throughout substantially the remaining portion of the outer periphery thereof, and a sealing gasket secured between the ring and plate members for engagement between the ring and plate members and the valve seats for precluding leakage of fluid in the closed position of the valve.

References Cited

UNITED STATES PATENTS

| 1,979,351 | 10/1934 | Phillips | 251—306 |
| 2,385,510 | 9/1945 | Harwood | 251—306 |
| 2,740,423 | 4/1956 | Stillwagon | 251—306 X |
| 2,847,181 | 8/1958 | Muller | 251—306 |
| Re. 24,102 | 12/1955 | Ohls | 251—317 |
| 1,346,887 | 7/1920 | Heald | 137—527.8 X |
| 1,682,075 | 8/1928 | Foulds | 251—307 |
| 2,225,081 | 12/1940 | O'Hare | 251—358 |

FOREIGN PATENTS 490,311  1/1930  Germany.

WILLIAM F. O'DEA, *Primary Examiner.*

D. J. ZOBKIW, *Assistant Examiner.*